US012681888B2

(12) United States Patent
Hong et al.

(10) Patent No.: US 12,681,888 B2
(45) Date of Patent: Jul. 14, 2026

(54) MANAGING DATA TRANSMISSIONS WITH SELECTABLE MODES

(71) Applicant: Aivres Systems Inc., San Jose, CA (US)

(72) Inventors: Zimin Hong, New Taipei City (TW); Chengwei Lin, New Taipei City (TW)

(73) Assignee: Aivres Systems Inc., Fremont, CA (US)

( * ) Notice: Subject to any disclaimer, the term of this patent is extended or adjusted under 35 U.S.C. 154(b) by 0 days.

(21) Appl. No.: 19/006,722

(22) Filed: Dec. 31, 2024

(65) Prior Publication Data

US 2026/0187014 A1 Jul. 2, 2026

(51) Int. Cl.
G06F 13/42 (2006.01)

(52) U.S. Cl.
CPC .. G06F 13/4221 (2013.01); *G06F 2213/0026* (2013.01)

(58) Field of Classification Search
CPC ..................... G06F 13/4221; G06F 2213/0026
See application file for complete search history.

(56) References Cited

U.S. PATENT DOCUMENTS 6,114,989 A * 9/2000 Fontes .................... G01S 19/23
342/357.57

FOREIGN PATENT DOCUMENTS

CN 116627880 A * 8/2023 ......... G06F 13/4282
CN 118860952 A * 10/2024 ......... G06F 13/4022

OTHER PUBLICATIONS

Translation of CN-116627880-A (Year: 2023).*
Translation of CN-118860952-A (Year: 2024).*

* cited by examiner

*Primary Examiner* — Henry Tsai
*Assistant Examiner* — John B Roche
(74) *Attorney, Agent, or Firm* — Fish & Richardson P.C.

(57) ABSTRACT

Methods, devices, subsystems, systems, and techniques for managing data transmissions with selectable modes are provided. In one aspect, a computing system includes: host devices, peripheral component interconnect express (PCIe) devices, and a PCIe controller having a PCIe switch coupled between the host devices and the PCIe devices. The PCIe controller is configured to: set a mode of the PCIe switch to be a first PCIe mode using first mode data, and transmit, under the first PCIe mode, first data between a first host device and at least one of the PCIe devices, and set the mode of the PCIe switch to be a second PCIe mode using second mode data, and transmit, under the second PCIe mode, second data between the first host device and one or more first PCIe devices and third data between a second host device and one or more second PCIe devices.

20 Claims, 9 Drawing Sheets

300

500

600

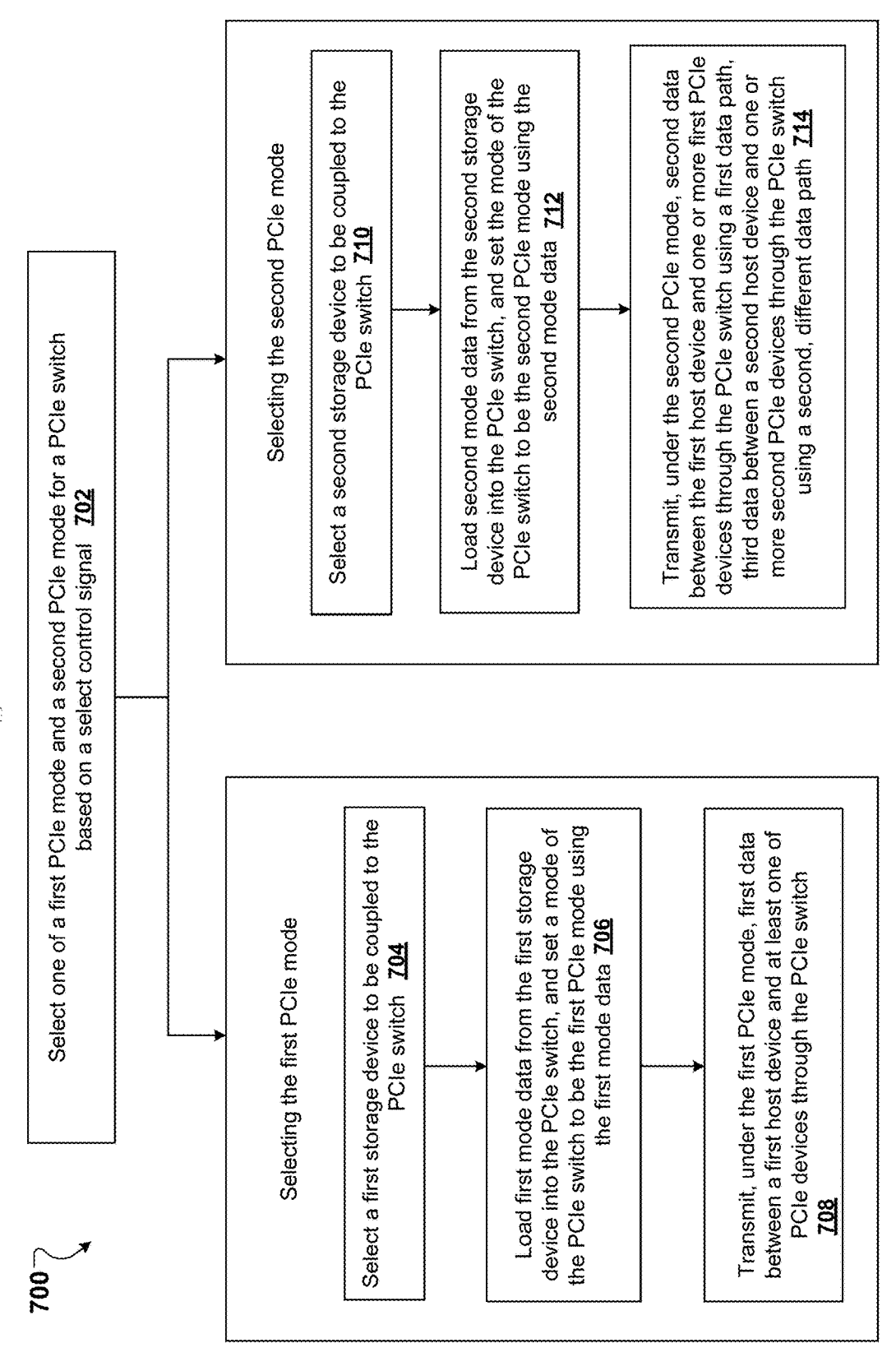

700

Select one of a first PCIe mode and a second PCIe mode for a PCIe switch based on a select control signal 702

Selecting the first PCIe mode

Select a first storage device to be coupled to the PCIe switch 704

Load first mode data from the first storage device into the PCIe switch, and set a mode of the PCIe switch to be the first PCIe mode using the first mode data 706

Transmit, under the first PCIe mode, first data between a first host device and at least one of PCIe devices through the PCIe switch 708

Selecting the second PCIe mode

Select a second storage device to be coupled to the PCIe switch 710

Load second mode data from the second storage device into the PCIe switch, and set the mode of the PCIe switch to be the second PCIe mode using the second mode data 712

Transmit, under the second PCIe mode, second data between the first host device and one or more first PCIe devices through the PCIe switch using a first data path, third data between a second host device and one or more second PCIe devices through the PCIe switch using a second, different data path 714

FIG. 7

MANAGING DATA TRANSMISSIONS WITH SELECTABLE MODES

TECHNICAL FIELD

The present disclosure is related to data transmissions, e.g., Peripheral Component Interconnect Express (PCIe) data transmissions.

BACKGROUND

Computing devices, such as servers, are widely used in a variety of fields. In areas such as artificial intelligence (AI) and big data, the need for computing is growing rapidly. To improve flexibility and computational efficiencies, some computing devices are configured to include different external devices within the same server chassis, making the computing devices suitable for a variety of applications. Some computing devices use a Peripheral Component Interconnect Express (PCIe) bus to connect the external devices to processing devices on a motherboard.

SUMMARY

The present disclosure describes methods, devices, systems, and techniques for managing data transmissions with selectable modes, e.g., selectable PCIe modes for data transmissions between host devices and PCIe devices.

One aspect of the present disclosure features a computing system, including: host devices including a first host device and a second host device; peripheral component interconnect express (PCIe) devices including one or more first PCIe devices and one or more second PCIe devices; a PCIe controller including a PCIe switch coupled between the host devices and the PCIe devices. The PCIe controller is configured to: set a mode of the PCIe switch to be a first PCIe mode using first mode data of the first PCIe mode, and transmit, under the first PCIe mode, first data between the first host device and at least one of the PCIe devices, and set the mode of the PCIe switch to be a second PCIe mode using second mode data of the second PCIe mode, and transmit, under the second PCIe mode, second data between the first host device and the one or more first PCIe devices and third data between the second host device and the one or more second PCIe devices.

In some implementations, the PCIe controller further includes: a multiplexer including a first input port coupled to the PCIe switch, a first storage device configured to store the first mode data of the first PCIe mode and coupled to a first output port of the multiplexer, and a second storage device configured to store the second mode data of the second PCIe mode and coupled to a second output port of the multiplexer.

In some implementations, the multiplexer is configured to: in response to receiving a select control signal, control a selection of coupling the input port to one of the first output port and the second output port based on the select control signal.

In some implementations, the PCIe controller includes a signal controller coupled to a second input port of the multiplexer and configured to generate the select control signal and transmit the select control signal to the multiplexer.

In some implementations, the signal controller includes: a I2C (inter-integrated circuit) master and a control circuit coupled to the I2C master. The I2C master is configured to transmit a I2C command to the control circuit, and the control circuit is configured to generate the select control signal based on the I2C command.

In some implementations, the I2C master is configured to generate the I2C command based on an input to the I2C master. In some implementations, the I2C master includes a microcontroller unit (MCU), and the control circuit includes a complex programmable logic device (CPLD).

In some implementations, the multiplexer is configured to: transmit a device select signal from the PCIe switch through the first input port of the multiplexer to the one of the first output port and the second output port of the multiplexer to select a corresponding one of the first storage device and the second storage device.

In some implementations, the PCIe switch includes switch transmission ports coupled to each of corresponding first transmission ports of the first storage device and corresponding second transmission ports of the second storage device. The PCIe switch is configured to: if the first storage device is selected based on the select control signal and the device select signal, load the first mode data from the first storage device through the corresponding first transmission ports and the switch transmission ports, and set the mode of the PCIe switch to the first PCIe mode in the PCIe switch, and if the second storage device is selected based on the select control signal and the device select signal, load the second mode data from the second storage device through the corresponding second transmission ports and the switch transmission ports, and set the mode of the PCIe switch to the second PCIe mode in the PCIe switch.

In some implementations, the select transmission ports include: a reset port for transmitting a resetting signal, a clock port for transmitting a clock signal, and one or more data ports for transmitting data.

In some implementations, each of the first storage device and the second storage device includes a corresponding flash read-only memory (ROM).

In some implementations, the PCIe switch includes downstream ports and upstream ports, each of the downstream port being coupled to a respective PCIe device of the PCI devices, each of the upstream ports being coupled to a respective host device of the host devices.

In some implementations, under the first PCIe mode, each of the one or more first PCIe devices and the one or more second PCIe devices communicates with each other using peer-to-peer communication directly through the PCIe switch, bypassing the first host device, and the first data is transmitted between the first host device and the one or more first PCIe devices and the one or more second PCIe devices through the PCIe switch using a data path.

In some implementations, under the second PCIe mode, each of the one or more first PCIe devices communicates with each other using peer-to-peer communication directly through the PCIe switch, bypassing the first host device, and the second data is transmitted between the one or more first PCIe devices and the first host device through the PCIe switch using a first data path, and each of the one or more second PCIe devices communicates with each other using peer-to-peer communication directly through the PCIe switch, bypassing the second host device, and the third data is transmitted between the one or more second PCIe devices and the second host device through the PCIe switch using a second data path that is different from the first data path.

In some implementations, the host devices include at least one of one or more central processing units (CPUs), one or more data processing units (DPUs), one or more tensor processing units (TPUs), one or more quantum processing units (QPUs), one or more Application Specific Integrated Circuits (ASICs), one or more Field Programmable Gate Arrays (FPGAs), or one or more other processing devices.

In some implementations, the PCIe devices include at least one of one or more Graphics Processing Units (GPUs), one or more storage devices, one or more network devices, one or more sound devices, one or more capture devices, or one or more expansion devices.

In some implementations, the second PCIe mode includes more firmware setting parameters than the first PCIe mode. In some implementations, the first PCIe mode includes a single host mode (e.g., a base mode) for PCIe data transmission, and the second PCIe mode includes a multi-host mode (e.g., an SSW mode) for PCIe data transmission.

In some implementations, the PCIe controller is configured to transmit data between the host devices and the PCIe devices using a PCIe protocol, and the host devices are configured to transmit data between each other using a protocol different from the PCIe protocol.

In some implementations, the computing system includes a plurality of subsystems. Each of the plurality of subsystems includes a corresponding PCIe controller, corresponding host devices, and corresponding PCIe devices, and the corresponding PCIe controller includes a corresponding PCIe switch coupled between the corresponding host devices and the corresponding PCIe devices.

Another aspect of the present disclosure features a device, including: a peripheral component interconnect express (PCIe) switch; a multiplexer including an input port coupled to the PCIe switch; a first storage device configured to store first mode data of a first PCIe mode and coupled to a first output port of the multiplexer, and a second storage device configured to store second mode data of a second PCIe mode and coupled to a second output port of the multiplexer. The multiplexer is configured to: select a corresponding one of the first storage device and the second storage device to be coupled to the PCIe switch based on a select control signal. The PCIe switch is configured to: if the first storage device is selected, load the first mode data from the first storage device, and set a mode of the PCIe switch to be the first PCIe mode in the PCIe switch, and if the second storage device is selected, load the second mode data from the second storage device, and set the mode of the PCIe switch to be the second PCIe mode in the PCIe switch.

In some implementations, the multiplexer is configured to: control a selection of coupling the input port to one of the first output port and the second output port based on the select control signal, and transmit a device select signal from the PCIe switch through the input port of the multiplexer to the one of the first output port and the second output port of the multiplexer to select the corresponding one of the first storage device and the second storage device.

In some implementations, the device further includes a signal controller coupled to a second input port of the multiplexer and configured to generate the select control signal and transmit the select control signal to the multiplexer.

Another aspect of the present disclosure features a method, including: selecting one of a first peripheral component interconnect express (PCIe) mode and a second PCIe mode for a PCIe switch that is coupled between host devices and PCIe devices, the host device including a first host device and a second host device; and performing data transmission between the host devices and the PCIe devices using the selected one of the first PCIe mode and the second PCIe mode. Performing the data transmission includes one of: if the first PCIe mode is selected, setting a mode of the PCIe switch to be the first PCIe mode using first mode data of the first PCIe mode, and transmitting, under the first PCIe mode, first data between the first host device and at least one of the PCIe devices, and if the second PCIe mode is selected, setting the mode of the PCIe switch to be the second PCIe mode using second mode data of the second PCIe mode, and transmitting, under the second PCIe mode, second data between the first host device and one or more first PCIe devices of the PCIe devices and third data between the second host device and one or more second PCIe devices of the PCIe devices.

In some implementations, selecting the one of the first PCIe mode and the second PCIe mode for the PCIe switch includes: generating a select control signal for a multiplexer coupled between the PCIe switch and a first storage device storing the first mode data of the first PCIe mode and a second storage device storing the second mode date of the second PCIe mode; and selecting a corresponding one of the first storage device and the second storage device based on the select control signal to be coupled to the PCIe switch using a device select signal from the PCIe switch, the corresponding one of the first storage device and the second storage device storing corresponding mode data of the selected one of the first PCIe mode and the second PCIe mode. The method further includes: loading the corresponding mode date of the selected one of the first PCIe mode and the second PCIe mode from the corresponding one of the first storage device and the second storage device into the PCI switch, and setting the mode of the PCI switch to be the selected one of the first PCIe mode and the second PCIe mode.

In some implementations, generating the select control signal for the multiplexer includes: in response to an input, generating an I2C (inter-integrated circuit) command by a I2C master, and generating the select control signal based on the I2C command by a control circuit coupled to the I2C master, where the control circuit is coupled to the multiplexer.

Another aspect of the present disclosure features a method including: selecting a first storage device to be coupled to a peripheral component interconnect express (PCIe) switch, where the PCIe switch is coupled between host devices and PCIe devices; loading first mode data of a first PCIe mode from the first storage device into the PCIe switch, and setting a mode of the PCIe switch to be the first PCIe mode using the first mode data; transmitting, under the first PCIe mode, first data between a first host device of the host devices and at least one of the PCIe devices through the PCIe switch; selecting a second storage device to be coupled to the PCIe switch; loading second mode data of a second PCIe mode from the second storage device into the PCIe switch, and setting the mode of the PCIe switch to be the second PCIe mode using the second mode data; and transmitting, under the second PCIe mode, second data between the first host device and one or more first PCIe devices of the PCIe devices through the PCIe switch using a first data path, and third data between a second host device and the one or more second PCIe devices of the PCIe devices through the PCIe switch using a second data path. The second host device is different from the first host device, the one or more second PCIe devices are different from the one or more first PCIe devices, and the second data path is different from the first data path.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIG. 7 is a flowchart of an example process of a computer-implemented method for managing data transmissions with selectable modes.

Like reference numbers and designations in the various drawings indicate like elements.

DETAILED DESCRIPTION

Implementations of the present disclosure provide a computing system that includes host devices comprising a first host device and a second host device, peripheral component interconnect express (PCIe) devices comprising one or more first PCIe devices and one or more second PCIe devices, and a PCIe controller comprising a PCIe switch coupled between the host devices and the PCIe devices. The PCIe controller is configured to set a mode of the PCIe switch to be a first PCIe mode using first mode data of the first PCIe mode, and transmit, under the first PCIe mode, first data between the first host device and at least one of the PCIe devices, and set the mode of the PCIe switch to be a second PCIe mode using second mode data of the second PCIe mode, and transmit, under the second PCIe mode, second data between the first host device and the one or more first PCIe devices and third data between the second host device and the one or more second PCIe devices.

The subject matter described in this specification can be implemented to realize one or more of the following technical advantages and/or benefits. For example, described systems and techniques can accommodate changing between two different PCIe data transmission modes without a need to change a PCIe switch. Thus, the systems and techniques allow a single PCIe switch that can switch between data transmission modes to select a mode that is most appropriate for an application. Integrating two modes within a single switch allows for the use of one device for multiple applications.

The following detailed description describes systems and techniques to managing data transmissions with selectable modes, e.g., selectable PCIe modes for data transmissions between host devices (e.g., CPUs, ASICs, and/or FPGAs) and PCIe devices (e.g., GPUs, DPUs, Storage devices, and/or Network Cards). The following detailed description is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Figure 1:
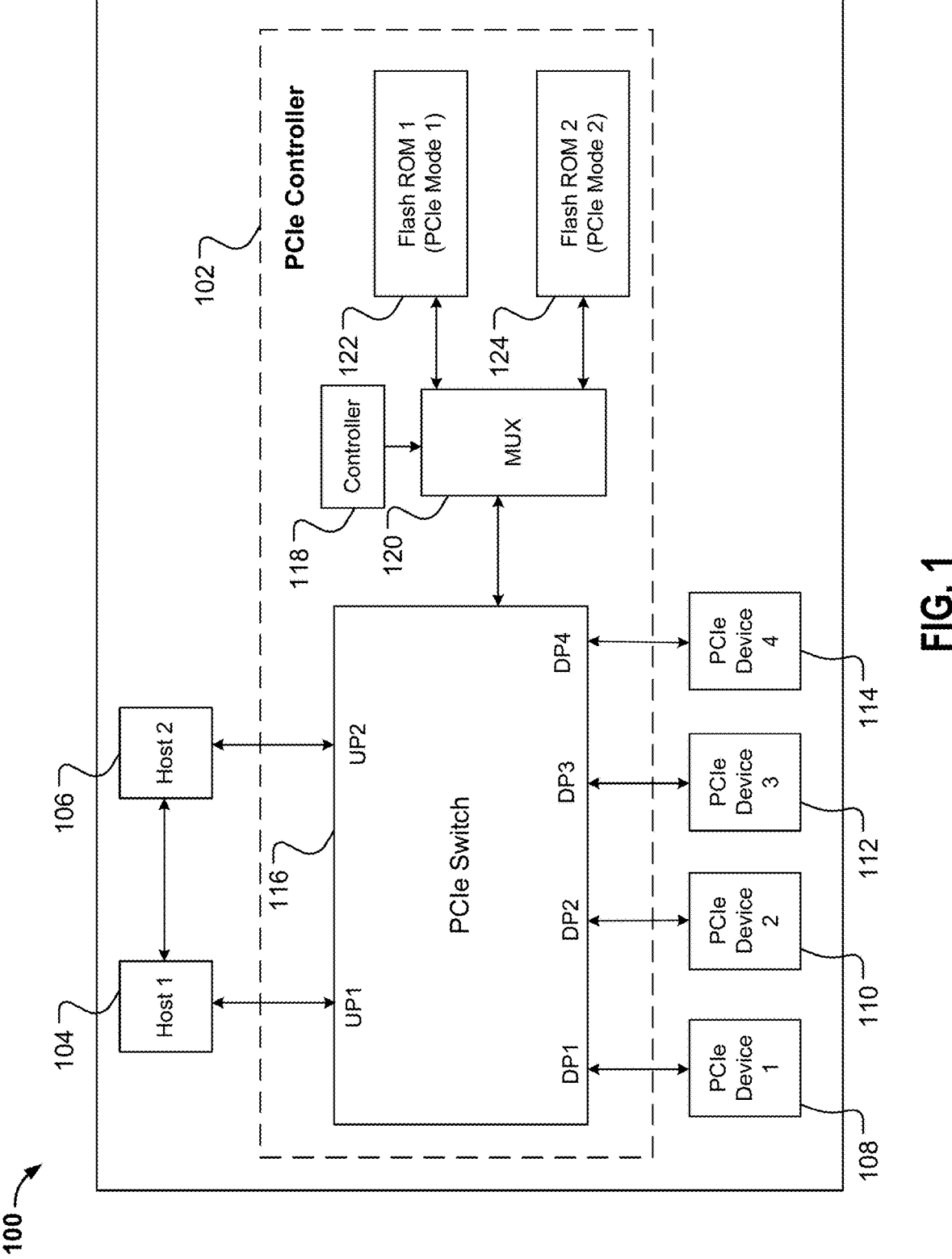
FIG. 1 illustrates an example computing system for managing data transmissions with selectable modes between host devices and PCIe devices through a PCIe controller.

FIG. 1 illustrates an example computing system 100 for managing data transmissions with selectable modes between host devices 104 and 106 and PCIe devices 108, 110, 112, and 114 through a PCIe controller 102. The computing system 100 can be a cloud server that can include one or more subsystems. The cloud server can include a plurality of host devices 104 and 106 and a plurality of PCIe devices 108, 110, 112, and 114 and a plurality of PCIe switches 116. In one example, as illustrated in FIG. 1, a subsystem can include 2 host devices, 1 PCIe controller, and 4 PCIe devices (e.g., GPUs), and the PCIe controller can include 1 PCIe switch and 2 NAND flash memory chips for storing two mode settings.

The computing system 100 can include a motherboard that is a main circuit board that connects the computing system 100's internal components and external components, and allows them to communicate with each other. The motherboard can connect one or more processors, memory, graphics card, and other hardware.

Each host device 104 and 106 can include one or more processing devices, e.g., one or more central processing units (CPUs), one or more graphics processing units (GPUs), one or more data processing units (DPUs), one or more Application Specific Integrated Circuits (ASICs), one or more Field Programmable Gate Arrays (FPGAs), one or more multi-core processors, one or more microprocessors, one or more quantum processors, or a combination thereof. For example, each host device can connect a CPU.

The computing system 100 can use PCIe topology to accommodate one or more PCIe devices 108, 110, 112, and 114 external to the motherboard. PCIe is a standardized interface that connects components to a computer's motherboard for high-speed data transfer. PCIe can be used for connecting PCIe devices 108, 110, 112, and 114 to the motherboard. Each PCIe device 108, 110, 112, and 114 can include one or more external devices e.g., GPUs, expansion cards, storage devices, network devices, sound devices, capture devices, or a combination thereof. For example, the PCIe devices of the computing system 100 can include GPUs.

Rather than directly connecting the host devices 104 and 106 to the PCIe devices 108, 110, 112, and 106 using a PCIe bus, the computing system 100 includes a PCIe controller 102 attached to the motherboard. In some implementations, e.g., as illustrated in FIG. 1, the PCIe controller 102 includes a PCIe switch 116, a signal controller 118, a multiplexer 120, a first storage device 122, and a second storage device 124.

The PCIe switch 116 can connect the host devices 104 and 106 to the PCIe devices 108, 110, 112, and 114. The PCIe switch 116 transmits data between the host devices 104 and 106 and the PCIe devices 108, 110, 112, and 114. The PCIe switch 116 functions as a network hub, connecting multiple PCIe devices to one or more host devices. It facilitates efficient data transfer between these devices by managing the distribution of PCIe lanes, thereby optimizing performance and minimizing latency.

A PCIe switch 116 connects to the host devices 104 and 106 with one or more connectors, and each connector can connect to one or more PCIe devices 108, 110, 112, and 114. For example, as illustrated in FIG. 1, the PCIe switch 116 includes two upstream ports UP1 (or HP1) and UP2 (or HP2) that respectively connect to the host devices 104 and 106. and four downstream ports DP1, DP2, DP3, and DP4 that respectively connect to the four PCIe devices 108, 110, 112, and 114. Each upstream port can be coupled to a respective host device and each downstream port can be coupled to a respective PCIe device.

In some implementations, the computing system 100 includes one or more cages that can accommodate different types of PCIe devices 108, 110, 112, and 114. Each connector can connect to a cage which a PCIe device 108, 110, 112, and 114 plugs into. Each cage can include a printed circuit board (PCB) that allows users to add, remove, or exchange various types of PCIe devices. In some implementations, the cage can include a PCIe slot that connects to the PCIe device 108, 110, 112, and 114.

The host devices 104 and 106 can use the PCIe switch 116 to control the PCIe devices 108, 110, 112, and 114. The host devices 104 and 106 can communicate data with each other. For example, when the host devices are CPUs, the CPUs can transmit data with each other using a CPU protocol e.g., Ultra Path Interconnect (UPI) protocol. The PCIe devices 108, 110, 112, and 114 can not transmit data between each other and instead transmit data using the PCIe switch 116. To achieve low latency, the computing system 100 uses the PCIe switch 116 and PCIe protocol to find the shortest distance between two PCIe devices.

The computing system 100 can connect the host devices 104 and 106 and the PCIe devices in one of two PCIe modes. The mode settings for the two PCIe modes are separately stored within two different storage device 122 and 124. Under a different mode, the host device 104, 106 can be coupled to a different group of PCIe devices for operation. The PCIe devices 108, 110, 112, and 114 can be divided into groups of PCIe devices. For example, the devices 108 and 110 can be first PCIe devices and the devices 112 and 114 can be second PCIe devices.

The first PCIe mode can be a single host mode (e.g., a base mode) for PCIe data transmission. In the first PCIE mode, the PCIe switch 116 can a transmit data between a first host device and each of the PCIe devices 108, 110, 112,

114 (e.g., the first PCIe devices and the second PCIe devices) through the PCIe switch 116 using a data path. The groups of PCIe devices communicate with each other using peer-to-peer communication directly through the PCIe switch 116, bypassing the first host device. In the first PCIe mode, any additional host device aside from the first host cannot directly communicate with the PCIe devices. Instead, the additional host device can communicate with the first host device and the PCIe switch 116 transmits the data from the first host device to the PCIe devices. This increases latency and reduces transmission speed. The first mode is described in further detail below with reference to FIG. 5.

The second PCIe mode can be a multi-host mode (e.g., an SSW mode) for PCIe data transmission. In the second PCIe mode, each host device is associated with a group of PCIe devices. Each host device can transmit data to its respective associated group of PCIe devices as well as to each of the other host devices. Within a group of PCIe devices, each of the PCIe devices communicates with each other using peer-to-peer communication directly through the PCIe switch, bypassing the associated host device. Data is transmitted between the PCIe devices in the group and the first host device through the PCIe switch using a respective data path. Each data path between a host device and its respective associated group of PCIe devices is different from each other. Data can be transmitted between a host device and a non-associated group of PCIe devices by first transmitting the data to the host device associated with the group of PCIe devices. The second PCIe mode can include more firmware setting parameters than the first PCIe mode. When compared with the first mode, the second mode has increased transmission speeds but requires more resources to configure. The second mode is described in further detail below with reference to FIG. 6.

In some implementations, e.g., as illustrated in FIG. 1, the PCIE controller 102 uses the multiplexer 120 to select a PCIe mode for the PCIe switch 116, such that the PCIe switch 116 can couple the host devices 104, 106 with corresponding PCIe devices according to the setting of the selected PCIe mode. The multiplexer 120 can include two input ports. The PCIe switch 116 is coupled to one input port of the multiplexer 120 and the signal controller 118 is coupled to to another input port of the multiplexer. The signal controller 118 can generate a select control signal and transmit the select control signal to the multiplexer 120. The select control signal can indicate a mode for the PCIe switch. For example, a high level (High) signal can indicate to select the first PCIe mode and a low level (Low) signal can indicate to select the second PCIe mode.

In response to receiving the select control signal, the multiplexer 120 can select either the first storage device 122 or the second storage device 124 to be coupled to the PCIe switch 116 based on the select control signal. The first storage device 122 and the second storage device 124 can each be a non-volatile memory (NVM) device, for example, a flash read-only memory (ROM). The first storage device 122 can be configured to store mode data for the first PCIe mode and the second storage device 124 can be configured to store mode data for the second PCIe mode. The first and second mode data can include, for example, firmware data stored in the respective flash ROM.

The first storage device 122 can be coupled to a first output port of the multiplexer 120. When the select control signal indicates to select the first PCIe mode, the multiplexer 120 can select the first storage device 122 and the PCIe switch 116 can load the mode data from the first storage device 122 and set a mode of the PCIe switch 116 to be the first PCIe mode. The second storage device 124 can be coupled to a second output port of the multiplexer 120. When the select control signal indicates to select the second PCIe mode, the multiplexer 120 can select the second storage device 124 and the PCIe switch 116 can load the mode data from the second storage device 124 and set a mode of the PCIe switch 116 to be the second PCIe mode.

Figure 2:
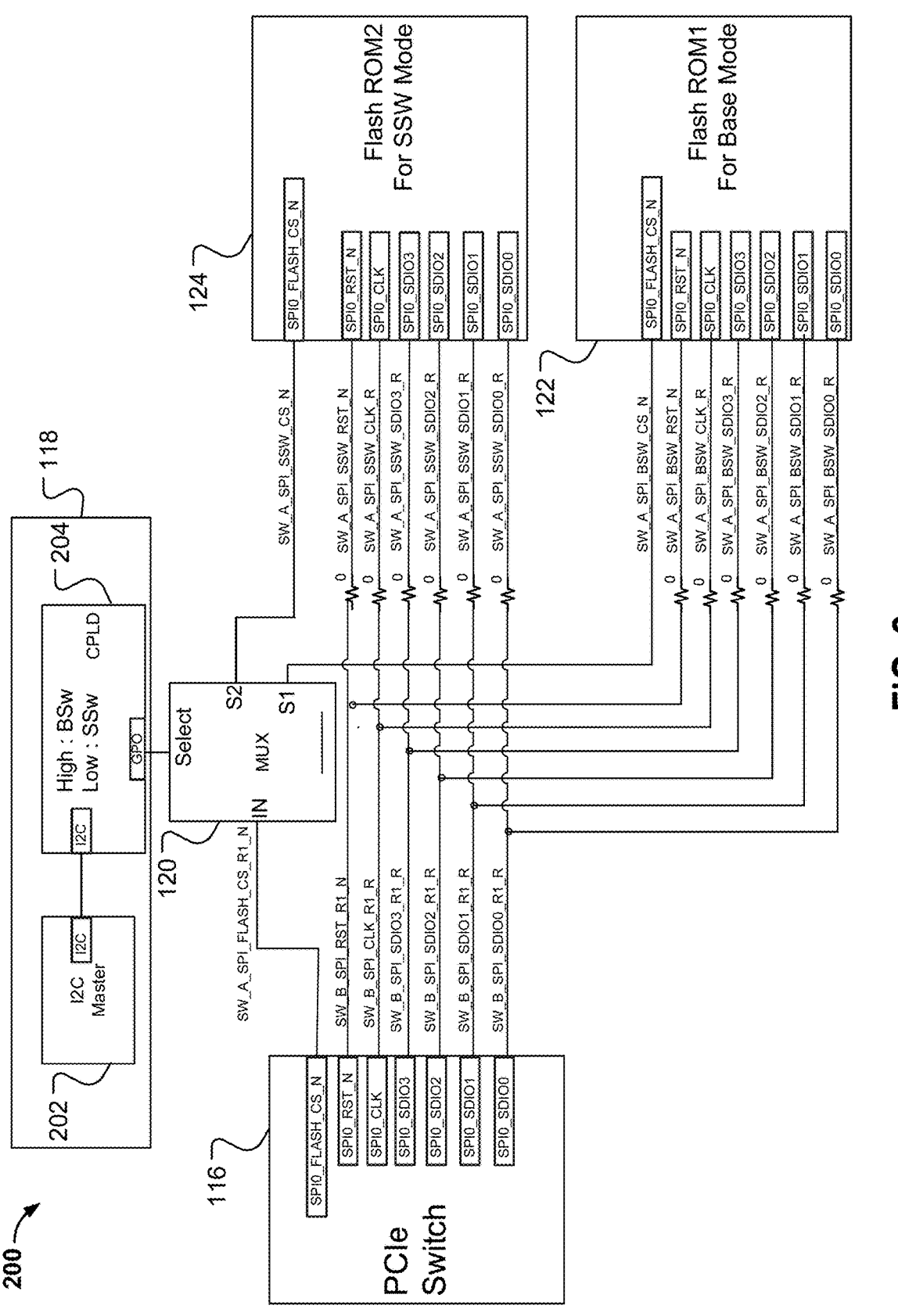
FIG. 2 illustrates an example PCIe controller.

FIG. 2 illustrates an example PCIe controller 200, which can be implemented as the PCIe controller 102 of FIG. 1. As illustrated in FIG. 2, the PCIe controller 200 can include a signal controller 116, a control circuit 204 coupled to the signal controller 116, the PCIe switch 116, the multiplexer 120, the first storage device 122, and the second storage device 124.

In some implementations, the signal controller 116 includes a I2C master (or a microcontroller) 202 and a control circuit 204 coupled to the I2C master 202 The I2C master 202 transmits an I2C command to the control circuit 204. In some examples, the I2C master 202 can generate the I2C command based on an input to the I2C master e.g., a user input by programming instructions to the I2C master. The I2C master can be, for example a microcontroller unit (MCU) that can perform simpler tasks than a CPU. A MCU has its own OS and can operate independently. The MCU can be an Advanced RISC Machine (ARM) chip that can control the I2C protocol. A user can program instructions in the MCU to select a particular PCIe mode.

The control circuit 204 generates the select control signal based on the I2C command. The control circuit 204 can include, for example, a complex programmable logic device (CPLD). In operation, under I2C protocol, the I2C master sends a command to the CPLD and asks the CPLD to output a High or Low output signal through a general purpose output (GPO) of the CPLD.

The PCIe switch 116 can send a device select signal from a device select port, e.g., SPI0_FLASH_CS_N, to the first input port of the multiplexer 120. The multiplexer 120 transmits the device select signal (e.g., a chip select signal SW_A_SPI_FLASH_CS_R1_N) from the PCIe switch 116 through the first input port (IN) of the multiplexer 120 to either the first output port S1 to select the first storage device 122 (e.g., with the signal SW_A_SPI_BSW_CS_N) or the second output port S2 of the multiplexer to select the second storage device 124 (e.g., with the signal SW_A_SPI_SS-W_CS_N). For example, as illustrated in FIG. 2, the multiplexer 120 uses the select control signal to select the first output port S1 for the first PCIe mode (e.g., base mode) or the second output port S2 for the second PCIe mode (e.g., SSW mode). The multiplexer 120 can include, for example, a metal oxide semiconductor (MOS) transistor switch.

The PCIe switch 116 can include switch transmission ports coupled to each of corresponding first transmission ports of the first storage device 122 and corresponding second transmission ports of the second storage device 124. The transmission ports can use, for example, Serial Peripheral Interface Bus (SPI) protocol to select a storage device from the PCIe switch 116. The transmission ports can include a reset port (e.g., SPI0_RST_N) for transmitting a resetting signal (e.g., SW_B_SPI_RST_R1_N), a clock port (e.g., SPI0_CLK) for transmitting a clock signal (e.g., SW_B_SPI_CLK_R1_R), and one or more data ports (e.g., SPI0_SDIO0, SPI0_SDIO1, SPI0_SDIO2, and SPI0_SDIO3) for transmitting data. As illustrated in FIG. 2, the corresponding first transmission ports of the first storage device 122 can include, e.g., SPI0_FLASH_CS_N, SPI0_RST_N, SPI0_CLK, SPI0_SDIO0, SPI0_SDIO1, SPI0_SDIO2, SPI0_SDIO3, and the corresponding second transmission ports of the second storage device 124 can include, e.g., SPI0_FLASH_CS_N, SPI0_RST_N, SPI0_CLK, SPI0_SDIO0, SPI0_SDIO1, SPI0_SDIO2, SPI0_SDIO3. In some implementations, under the SPI protocol, the PCIe switch 116 transmits the resetting signal SW_B_SPI_RST_R1_N through transmission port SPI0_RST_N of the PCIe switch 116 to the first storage device 122 that receives signal SW_A_SPI_BSW_RST_N at transmission port SPI0_RST_N and/or to the second storage device 124 that receives signal SW_A_SPI_SS-W_RST_N at transmission port SPI0_RST_N of the second storage device 124; the PCIe switch 116 transmits the clocking signal SW_B_SPI_CLK_R1_R through transmission port SPI0_CLK of the PCIe switch 116 to the first storage device 122 that receives signal SW_A_SP-I_BSW_CLK_R at transmission port SPI0_CLK and/or to the second storage device 124 that receives signal SW_A_SPI_SSW_CLK_R at transmission port SPI0_CLK of the second storage device 124; the PCIe switch 116 transmits a data signal SW_B_SPI_SDIO3_R1_R through transmission port SPI0_SDIO3 of the PCIe switch 116 to the first storage device 122 that receives signal SW_A_SPI_BSW_SDIO3_R at transmission port SPI0_SDIO3 and/or to the second storage device 124 that receives signal SW_A_SPI_SSW_SDIO3_R at transmission port SPI0_SDIO3 of the second storage device 124; the PCIe switch 116 transmits a data signal SW_B_SPI_SDIO2_R1_R through transmission port SPI0_SDIO2 of the PCIe switch 116 to the first storage device 122 that receives signal SW_A_SPI_BSW_SDIO2_R at transmission port SPI0_SDIO2 and/or to the second d storage device 124 that receives signal SW_A_SPI_SSW_SDIO2_R at transmission port SPI0_SDIO2 of the second storage device 124; the PCIe switch 116 transmits a data signal SW_B_SPI_SDIO1_R1_R through transmission port SPI0_SDIO1 of the PCIe switch 116 to the first storage device 122 that receives signal SW_A_SPI_BSW_SDIO1_R at transmission port SPI0_SDIO1 and/or to the second storage device 124 that receives signal SW_A_SPI_SSW_SDIO1_R at transmission port SPI0_SDIO1 of the second storage device 124; and the PCIe switch 116 transmits a data signal SW_B_SPI_SDIO0_R1_R through transmission port SPI0_SDIO0 of the PCIe switch 116 to the first storage device 122 that receives signal SW_A_SPI_BSW_SDIO0_R at transmission port SPI0_SDIO0 and/or to the second storage device 124 that receives signal SW_A_SPI_SSW_SDIO0_R at transmission port SPI0_SDIO0 of the second storage device 124.

After a storage device is selected based on the select control signal and the device select signal, the PCIe switch 116 can load the mode data from the selected storage device. The PCIe switch 116 can load the first mode data through the corresponding first transmission ports or load the second mode data from the corresponding second transmission ports into the PCIe switch 116 through the switch transmission ports. The PCIe switch 116 can set the mode of the PCIe switch 116 to the selected PCIe mode in the PCIe switch 116. The mode data can include settings of the selected mode. After the PCIe switch 116 loads the mode data, the PCIe switch settings are updated to the selected mode, and accordingly host devices and PCIe devices can communicate through the PCIe switch based on the selected mode. To switch modes, the PCIe switch 116 can load mode settings from the other storage device and the settings of PCIe switch can be automatically updated with the settings for the other mode.

Figure 3:
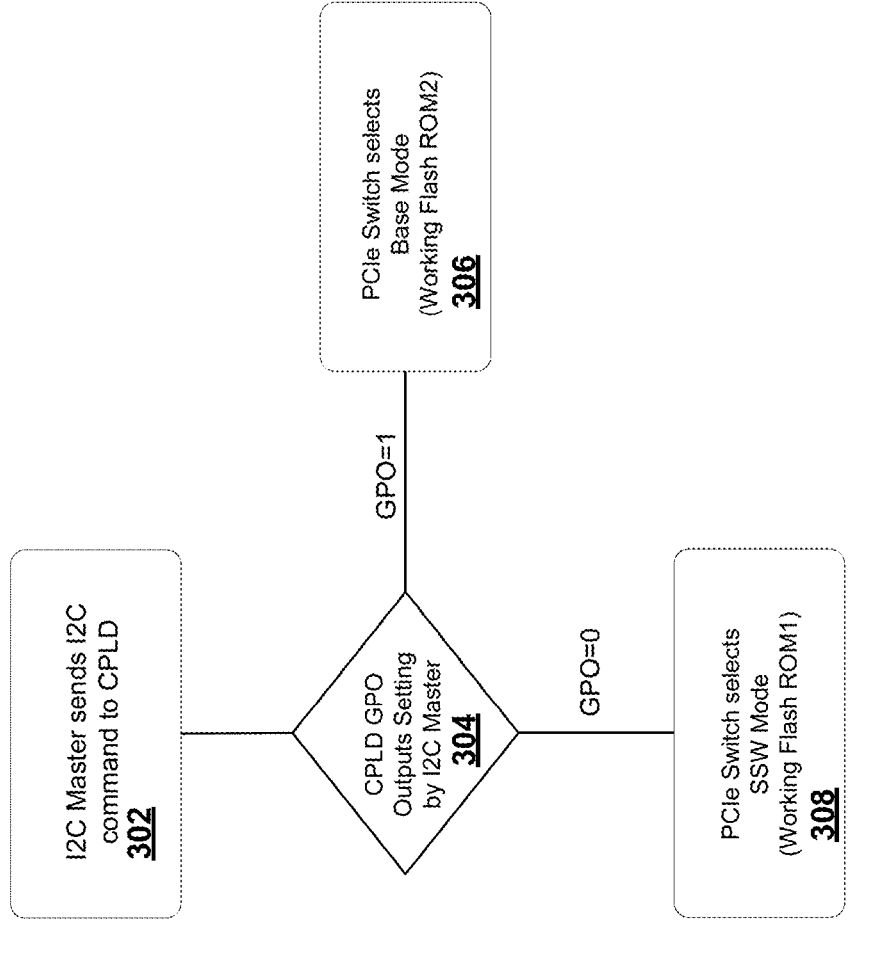
FIG. 3 is a flowchart of an example process of managing data transmissions with selectable modes using a PCIe controller.

FIG. 3 is a flowchart of an example process 300 of managing data transmissions with selectable modes using a PCIe controller e.g., the PCIe controller 102 of FIG. 1 or the PCIe controller 200 of FIG. 2. For clarity of presentation, the description that follows generally describes the process 300 in the context of the other figures in this description. However, it will be understood that process 300 can be performed, for example, by any system, environment, software, and hardware, or a combination of systems, environments, software, and hardware, as appropriate. In some implementations, various steps of process 300 can be run in parallel, in combination, in loops, or in any order. In some implementations, the computing system 100 can perform one or more, or all of the steps described in the process 300.

At 302, the PCIe controller can send an I2C command to a control circuit (e.g., the control circuit 204 of FIG. 2) using an I2C master (e.g., the I2C master 202 of FIG. 2). The control circuit can be, for example, a CPLD. In some examples, the I2C master can generate the I2C command based on an input to the I2C master e.g., a user input by programming instructions to the I2C master. The I2C master can be, for example a microcontroller unit (MCU) that can perform simpler tasks than a CPU.

At 304, the PCIe controller can output a select control signal using a GPO of the control circuit based on the I2C command from the I2C master. In operation, under I2C protocol, the I2C master sends the I2C command to the control circuit and the control circuit can output a High or Low output signal through the GPO based on the I2C command. The High signal can indicate that a PCIe switch should be set to a first mode and a Low signal can indicate that the PCIe switch should be set to a second mode. The PCIe device can be coupled with either a first storage device that stores settings data for the first mode or a second storage device that stores settings data for the second mode.

If the GPO outputs 1 (a High signal), at 306, the PCIe controller can select a single host mode for the PCIe switch. A multiplexer (e.g., the multiplexer 120 of FIG. 1 or 2) can transmit a device select signal from the PCIe switch through a first input port of the multiplexer to a first output port of the multiplexer to select the first storage device. For example, the multiplexer can the select control signal to select the output port S1 for the first PCIe mode.

If the GPO outputs 0 (a Low signal), at 308, the controller can select a multi-host mode for the PCIe switch. The multiplexer can transmit a device select signal from the PCIe switch through the first input port of the multiplexer to a second output port of the multiplexer to select the second storage device. For example, the multiplexer can use the select control signal to select the output port S2 for the second PCIe mode.

Figure 4:
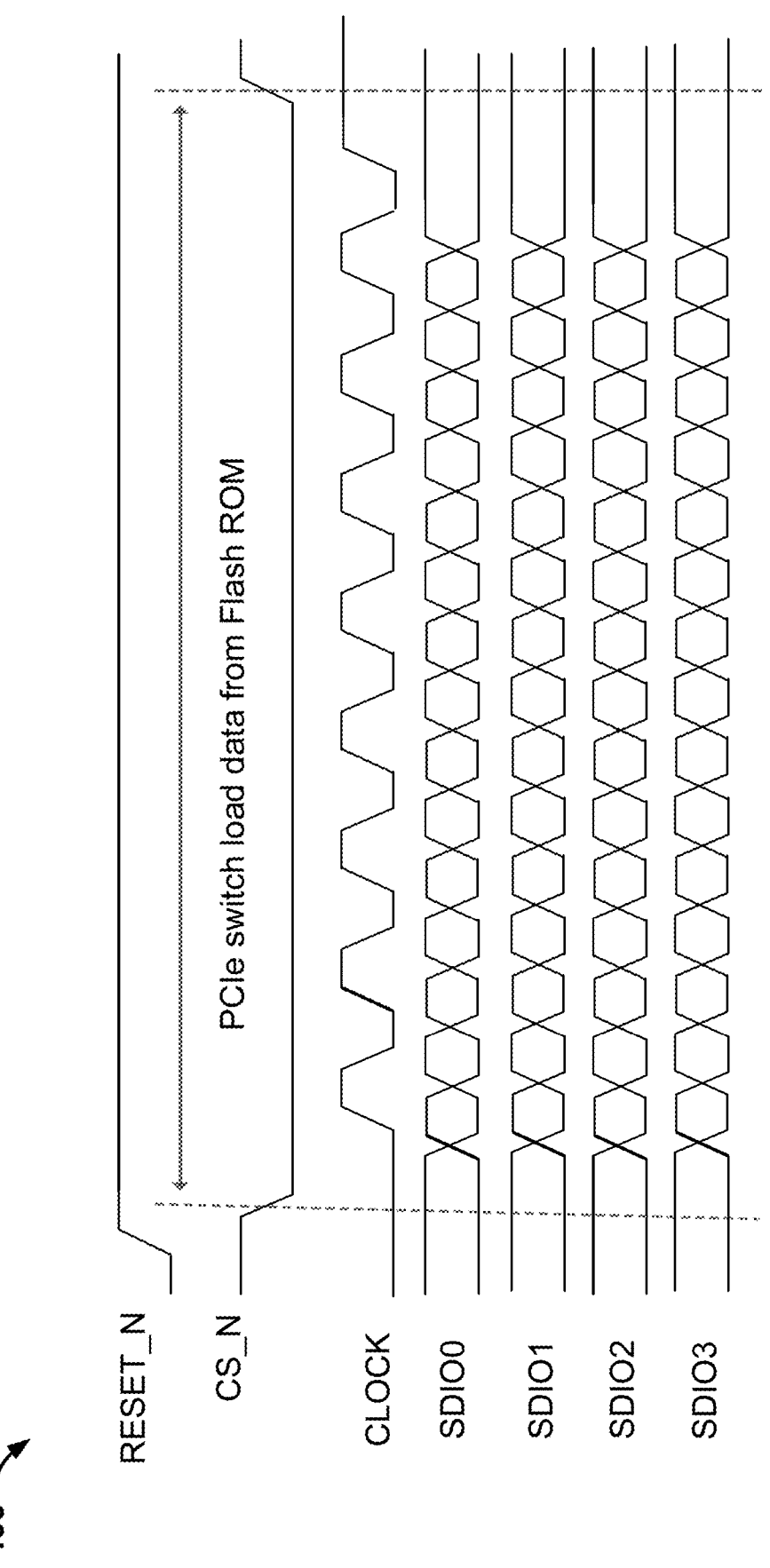
FIG. 4 illustrates an example timing diagram of a process of loading settings of a selectable mode from a flash ROM to a PCIe switch.

FIG. 4 illustrates an example timing diagram 400 of a process of loading settings of a selectable mode from a flash ROM to a PCIe switch. The flash ROM can be the first storage device 122 of FIG. 1 or 2, or the second storage device 134 of FIG. 1 or 2. The PCIe switch can be the PCIe switch 116 of FIG. 1 or 2.

A reset signal RESET_N can remain high to rest the settings of the PCIe switch. A Chip select signal CS_N can be kept low to select the flash ROM by the PCIe switch. A serial clock signal CLOCK can be used to synchronize actions between the PCIe switch and the flash ROM. Data signals SDIO0, SDIO1, SDIO2, and SDIO3 are transmitted from the flash ROM to the PCIe switch, while the flash ROM is selected by the Chip select signal CS_N.

During SPI transmission, the output CS_N is low, and the flash ROM is selected by the PCIe switch. The data signal SDIO0, SDIO1, SDIO2, and SDIO3, are transmitted from the flash ROM to the PCIe switch.

Figure 5:
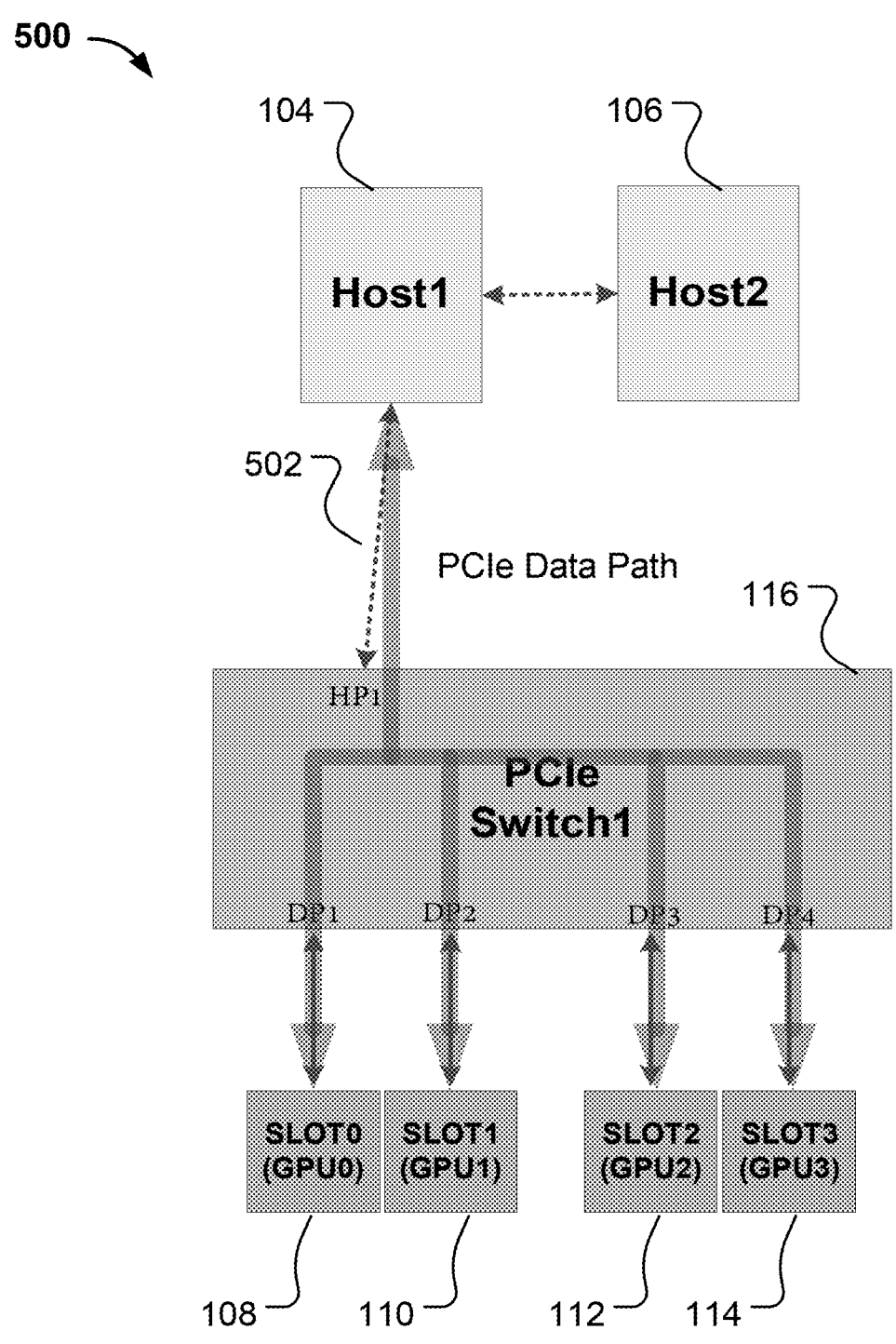
FIG. 5 illustrates an example system with a PCIe data transmission path between a host device and multiple PCI devices under a first PCIe mode.

FIG. 5 illustrates a system 500 with a PCIe data transmission path between a host device and multiple PCIe devices (e.g., GPUs) under a first PCIe mode. The first PCIe mode can be a single host mode (e.g., a base mode).

The system 500 can be same as, or similar to, the computing system 100 of FIG. 1. The system 500 includes a first host device 104, a second host device 106, four PCIe devices (e.g., GPUs) 108, 110, 112, and 114, and a PCIe switch 116. A data path 502 is formed between the first host device 104 and all four PCIe devices 108, 110, 112, and 114 according to a PCIe protocol. The PCIe devices can all communicate with each other through the PCIe switch 116. The host devices 104 and 106 can communicate with each other using a protocol (e.g., a CPU protocol) that is different from the PCIe protocol. The second host device 106 can only communicate with the PCIe devices 108, 110, 112, and 114 through the first host device 104.

For example, if the first host device 104 needs to perform an operation, the first host device can send commands to all four PCIe devices 108, 110, 112, and 114 through the PCIe switch 116. After the PCIe devices finish the command, the PCIe devices can transmit the result to the first host device 104 through the PCIe switch 116, along the data path 502. If the second host device 106 needs to operate the PCIe devices 108, 110, 112, and 114, the second host device 106 needs to communicate with the first host device 104 first, and the first host device 104 can communicate with the PCIe devices. The firmware in the PCIe switch 116 (e.g., the mode setting of the first PCIe mode) enables to connect the first host device 104 with the PCIe devices, but the second host device 106 is not connected with the PCIe devices.

Figure 6:
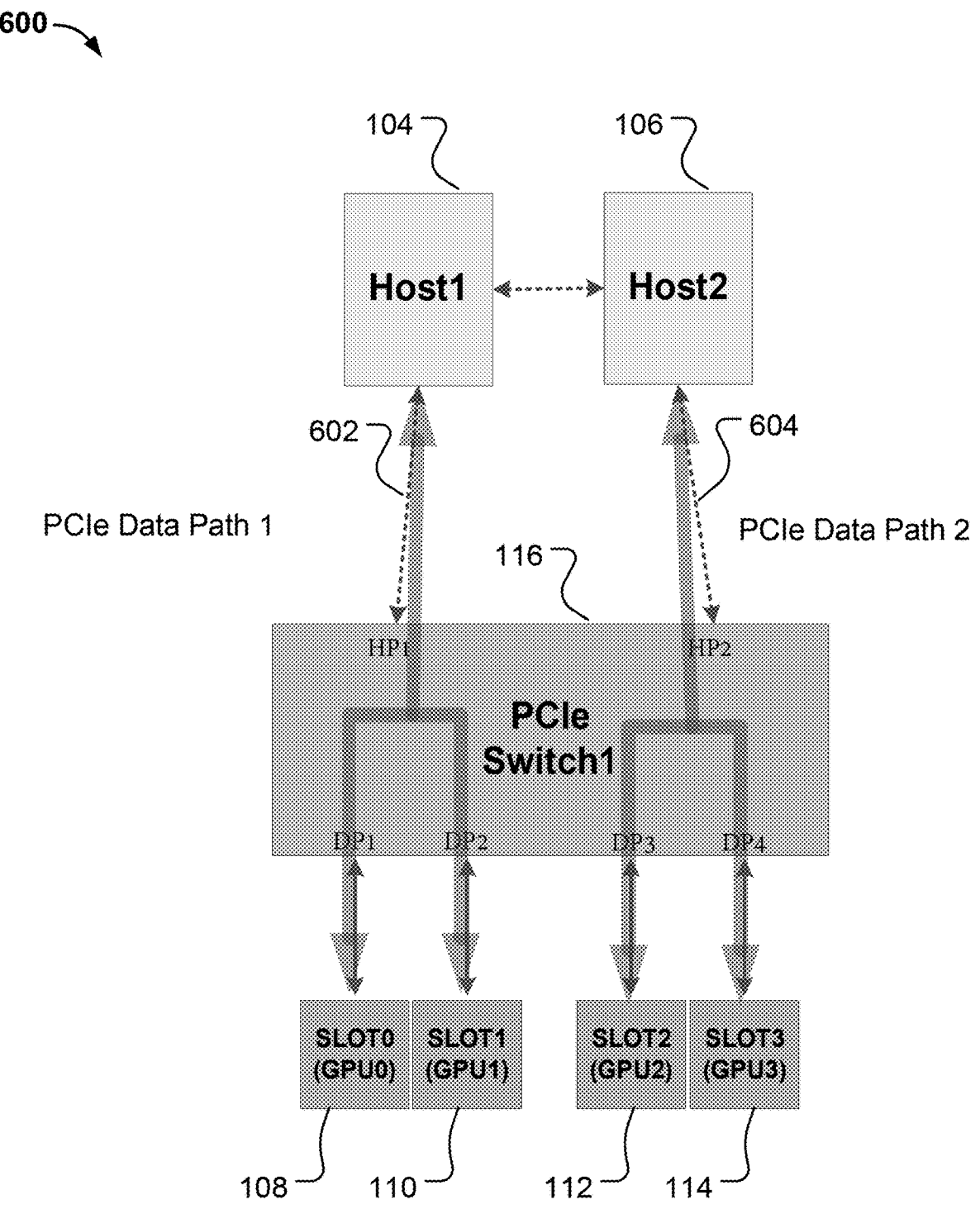
FIG. 6 illustrates an example system with PCIe data transmission paths between host devices and multiple PCI devices under a second PCIe mode.

FIG. 6 illustrates an example system 600 with PCIe data transmission paths between host devices and multiple PCI devices under a second PCIe mode. The second PCIe mode can be a multi-host mode (e.g., SSW mode). The example system 600 can be same as, or similar to, the system 100 of FIG. 1.

The system 600 includes a first host device 104, a second host device 106, four PCIe devices 108, 110, 112, and 114, a PCIe switch 116. First data path 602 and a second data path 604 are formed in the system 600, where the first host device 104 communicates with two PCIe devices 108, 110 using the first data path 602, and the second host device 106 communicates with two PCIe devices 112, 114 using the second data path 604. In comparison, only one data path 502 of FIG. 5 is formed between the first host device 104 and four PCIe devices 108, 110, 112, and 114.

For the two host devices 104, 106, the PCIe devices 108, 110, 112, 114 can be divided into two groups. The first group includes the PCIe devices 108 and 110. The second group includes the PCIe devices 112 and 114. The first data path 602 connects the first host device 104 to the PCIe devices 108 and 110 in the first group and connects the PCIe devices in the first group together. The second data path 604 connects the second host device 106 to the PCIe devices in the second group 112 and 114 and connects the PCIe devices in the second group together. The PCIe devices within the same group can communicate with each other through the PCIe switch 116. The first host device 104 can communicate with the PCIe devices in the first group, and the second host device 106 can communicate with the PCIe devices in the second group. The first host device 104 and the second host device 106 can communicate with each other using a protocol different from PCIe protocol.

For example, if the first host device 104 needs to communicate with the PCIe devices 108 and 110 in the first group, the first host device can directly communicate with the PCIe devices through the PCIe switch 116. If the second host device 106 needs to communicate with the PCIe devices 112 and 114 in the second group, the second host device can directly communicate with the PCIe devices through the PCIe switch 116. In such a way, a communication speed for the second mode can be higher than a communication speed for the first mode.

FIG. 7 is a flowchart of an example process 700 of a computer-implemented method for managing data transmissions with selectable modes. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order. In some implementations, the computing system 100 can perform one or more, or all of the processes described in the method 700.

At 702, the system can select one of a first PCIe mode and a second PCIe mode for a PCIe switch (e.g., the PCIe switch 116 of FIG. 1, 2, 5 or 6) based on a select control signal. In some implementations, a multiplexer (e.g., the multiplexer 120 of FIG. 1 or 2) with an input port coupled to the PCIe switch, in response to receiving the select control signal, can control a selection of coupling its input port to a first output port or a second output port based on the select control signal. In some implementations, the system can use a signal controller (e.g., the signal controller 118 of FIG. 1 or 2) coupled to a second input port of the multiplexer to generate the select control signal and transmit the select control signal to the multiplexer.

In some implementations, the first PCIe mode is a single host mode (e.g., a base mode) for PCIe data transmission and the second PCIe mode is a multi-host mode (e.g., an SSW mode) for PCIe data transmission. In some implementations, the second PCIe mode includes more firmware setting parameters than the first PCIe mode.

When the system selects the first PCIe mode, at 704, the system can select a first storage device (e.g., the first storage device 122 of FIG. 1 or 2) to be coupled to the PCIe switch. The first storage device can be configured to store first mode data of the first PCIe mode and coupled to a first output port of a multiplexer. The first storage device can be a non-volatile memory device, e.g., flash ROM, and the first mode data can be firmware data stored in the flash ROM. In some implementations, the multiplexer can transmit a device select signal from the PCIe switch through the input port of the multiplexer to the first output port the multiplexer to select the first storage device.

At 706, the system can load the first mode data from the first storage device into the PCIe switch. The system can set a mode of the PCIe switch to be the first PCIe mode using the first mode data.

At 708, the system can transmit, under the first PCIe mode, first data between a first host device and at least one PCIe device (e.g., the PCIe device 108, 110, 112, and/or 114 of FIG. 1, 2, 5, or 6) through the PCIe switch. Each of the PCIe devices can communicate with each other using peer-to-peer communication directly through the PCIe switch, bypassing the first host device. The first data is transmitted between the first host device and the one or more PCIe devices through the PCIe switch using a data path.

In some implementations, the host devices can include one of one or more central processing units (CPUs), one or more data processing units (DPUs), one or more tensor processing units (TPUs), one or more quantum processing units (QPUs), one or more Application Specific Integrated Circuits (ASICs), one or more Field Programmable Gate Arrays (FPGAs), or one or more other processing devices, or a combination thereof.

In some implementations, the PCIe devices can include at least one of one or more Graphics Processing Units (GPUs), one or more storage devices, one or more network devices, one or more sound devices, one or more capture devices, one or more expansion cards, or a combination thereof.

When the system selects the second PCIe mode, at 710, the system can select a second storage device (e.g., the second storage device 124 of FIG. 1 or 2) to be coupled to the PCIe switch. The second storage device can be configured to store second mode data of the first PCIe mode and coupled to a second output port of the multiplexer. The second storage device can be a non-volatile memory device, e.g., flash ROM, and the second mode data can be firmware data stored in the flash ROM. In some implementations, the multiplexer can transmit a device select signal from the PCIe switch through the input port of the multiplexer to the second output port of the multiplexer to select the second storage device.

At 712, the system can load the second mode data from the first storage device into the PCIe switch. The system can set a mode of the PCIe switch to be the second PCIe mode using the second mode data.

At 714, the system can transmit, under the second PCIe mode, second data between the first host device and one or more first PCIe devices (e.g., the PCI devices 108, 110 of FIG. 1, 2, 5, or 6) and third data between a second host device and one or more second PCIe devices (e.g., the PCI devices 112, 114 of FIG. 1, 2, 5, or 6) through the PCIe switch. Each of the one or more first PCIe devices can communicate with each other using peer-to-peer communication directly through the PCIe switch, bypassing the first host device. The second data can be transmitted between the one or more first PCIe devices and the first host device through the PCIe switch using a first data path. Each of the one or more second PCIe devices can communicate with each other using peer-to-peer communication directly through the PCIe switch, bypassing the second host device. The third data can be transmitted between the one or more second PCIe devices and the second host device through the PCIe switch using a second data path that is different from the first data path.

The techniques implemented in the present disclosure can be applied to systems including one or more host devices 104 and 106. The techniques can be applied in any system using PCIe protocol for data transmission between one or more host devices and a plurality of PCIe devices.

Figure 8:
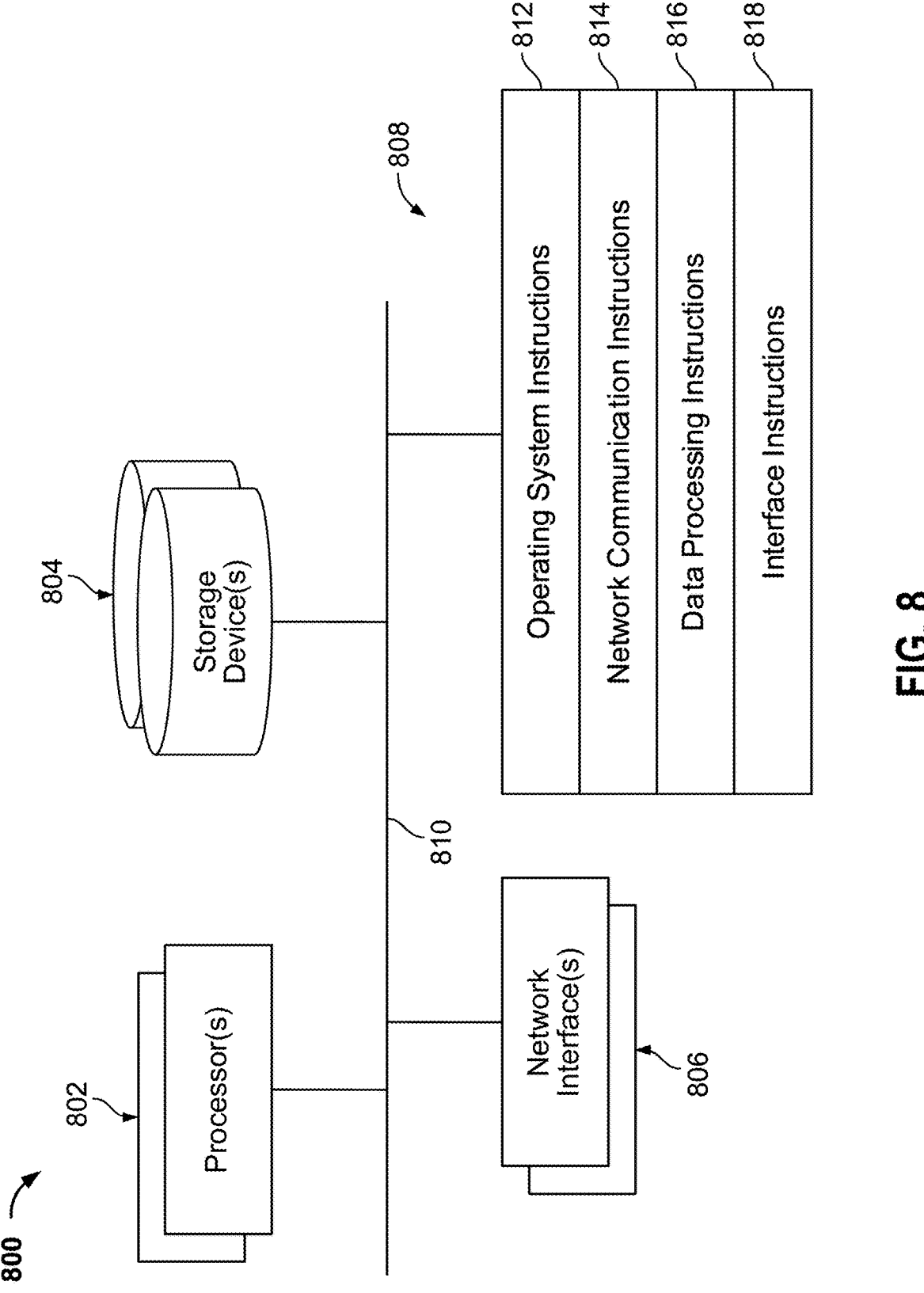
FIG. 8 is a block diagram illustrating an example of a computing system used to provide computational functionalities associated with described algorithms, methods, functions, processes, flows, and procedures.

FIG. 8 is a block diagram illustrating an example architecture 800 of a computing system used to provide computational functionalities associated with described algorithms, methods, functions, processes, flows, and procedures. The computing system can be implemented as the computing system 100 of FIG. 1. Other architectures are possible, including architectures with more or fewer components.

In some implementations, architecture 800 includes one or more processor(s) 802 (e.g., dual-core Intel® Xeon® Processors), one or more network interface(s) 806, one or more storage device(s) 804 (e.g., hard disk, optical disk, flash memory) and one or more computer-readable medium (s) 808 (e.g., hard disk, optical disk, flash memory, etc.). These components can exchange communications and data over one or more communication channel(s) 810 (e.g., buses), which can utilize various hardware and software for facilitating the transfer of data and control signals between components.

The computing system can, for example, use a PCIe switch between the processors 802 and storage devices 804, where the processors 802 can be host devices and the storage devices can be PCIe devices. In some examples, the computing system can use a PCIe switch between processors 802, e.g., CPUs and GPUs, where the CPUs can be host devices and GPUs can be PCIe devices. In some other examples, the computing system can use a PCIe switch between processors 802 and network interfaces 806, where the processors can be host devices and the network interfaces 806 can be PCIe devices.

The term "computer-readable medium" refers to any medium that participates in providing instructions to the processor(s) 802 for execution, including without limitation, non-volatile media (e.g., optical or magnetic disks), volatile media (e.g., memory) and transmission media. Transmission media includes, without limitation, coaxial cables, copper wire, and fiber optics.

Computer-readable medium(s) 808 can further include instructions 812 for an operating system (e.g., Mac OS® server, Windows® NT server, Linux Server), instructions 814 for network communications module, data processing instructions 816, and interface instructions 818.

Operating systems can be multi-user, multiprocessing, multitasking, multithreading, real time, etc. Operating system performs basic tasks, including but not limited to: recognizing input from and providing output to devices 802, 804, 806 and 808; keeping track and managing files and directories on computer-readable medium(s) 808 (e.g., memory or a storage device); controlling peripheral devices; and managing traffic on the one or more communication channel(s) 810. Network communications module includes various components for establishing and maintaining network connections (e.g., software for implementing communication protocols, such as TCP/IP, HTTP, etc.) and for creating a distributed streaming platform using, for example, Apache Kafka™. Data processing instructions 816 include server-side or backend software for implementing the server-side operations. Interface instructions 818 includes software for implementing a web server and/or portal for sending and receiving data to and from user side computing devices and service side computing devices.

Architecture 800 can be implemented by a cloud computing system and can be included in any computer device, including one or more server computers in a local or distributed network each having one or more processing cores. Architecture 800 can be implemented in a parallel processing or peer-to-peer infrastructure or on a single device with one or more processors. Software can include multiple software components or can be a single body of code.

Figure 9:
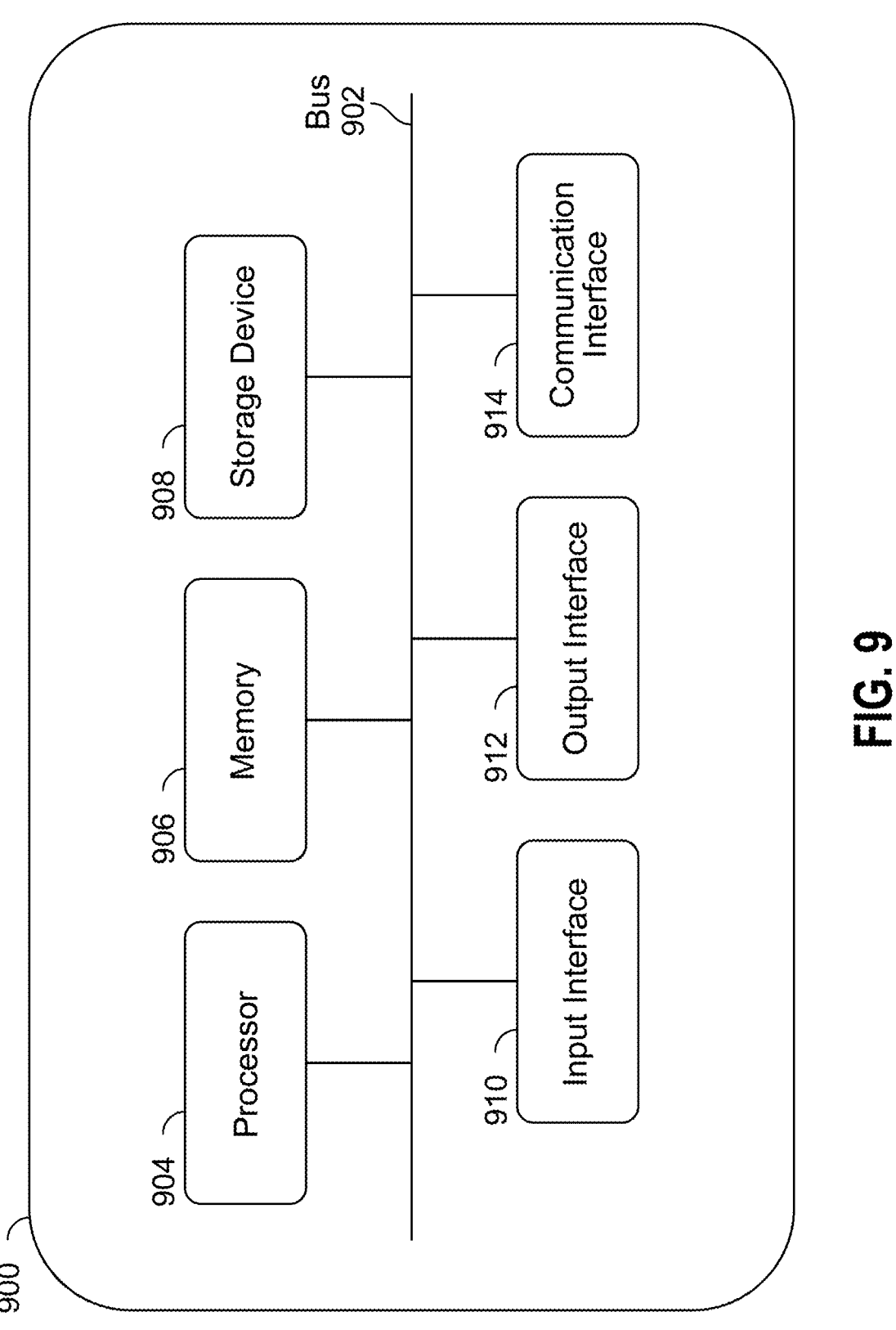
FIG. 9 is a block diagram illustrating an example of a computing device used to provide computational functionalities associated with described algorithms, methods, functions, processes, flows, and procedures.

FIG. 9 is a block diagram illustrating an example architecture of a computing device 900 used to provide computational functionalities associated with described algorithms, methods, functions, processes, flows, and procedures. The computing device 900 can be implemented as the computing system 100 of FIG. 1. Other architectures are possible, including architectures with more or fewer components.

The computing device 900 includes processor 904, memory 906, storage component 908, input interface 910, output interface 912, communication interface 914, and bus 902. For example, the computing device 900 can use a PCIe switch between the processor 904 and the storage device 908 and/or the communication interface 914, where the process 904 can be a host device and the storage component 908 and the communication interface 914 can be PCIe device(s).

Bus 902 includes a component that permits communication among the components of the computing device 900. In some embodiments, processor 904 is implemented in hardware, software, or a combination of hardware and software. In some examples, processor 904 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 906 includes random access memory (RAM), read-only memory (ROM), and/or another type of dynamic and/or static storage device (e.g., flash memory, magnetic memory, optical memory, and/or the like) that stores data and/or instructions for use by processor 904.

Storage component 908 stores data and/or software related to the operation and use of the computing device 900. In some examples, storage component 908 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 910 includes a component that permits the computing device 900 to receive information, such as via user input (e.g., a touchscreen display, a keyboard, a keypad, a mouse, a button, a switch, a microphone, a camera, and/or the like). Additionally or alternatively, in some embodiments input interface 910 includes a sensor that senses information (e.g., a global positioning system (GPS) receiver, an accelerometer, a gyroscope, an actuator, and/or the like). Output interface 912 includes a component that provides output information from the computing device 900 (e.g., a display, a speaker, one or more light-emitting diodes (LEDs), and/or the like).

In some embodiments, communication interface 914 includes a transceiver-like component (e.g., a transceiver, a separate receiver and transmitter, and/or the like) that permits the computing device 900 to communicate with other devices via a wired connection, a wireless connection, or a combination of wired and wireless connections. In some examples, communication interface 914 permits the computing device 900 to receive information from another device and/or provide information to another device. In some examples, communication interface 914 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, the computing device 900 performs one or more processes described herein. The computing device 900 performs these processes based on processor 904 executing software instructions stored by a computer-readable medium, such as memory 906 and/or storage component 908. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 906 and/or storage component 908 from another computer-readable medium or another device via communication interface 914. When executed, software instructions stored in memory 906 and/or storage component 908 cause processor 904 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 906 and/or storage component 908 includes data storage or at least one data structure (e.g., a database and/or the like). The computing device 900 is capable of receiving information from, storing information in, communicating information to, or searching information stored in the data storage or the at least one data structure in memory 906 or storage component 908. In some examples, the information includes network data, input data, output data, or any combination thereof.

In some embodiments, the computing device 900 is configured to execute software instructions that are either stored in memory 906 and/or in the memory of another device (e.g., another device that is the same as or similar to the computing device 900). As used herein, the term "module" refers to at least one instruction stored in memory 906 and/or in the memory of another device that, when executed by processor 904 and/or by a processor of another device (e.g., another device that is the same as or similar to the computing device 900) cause the computing device 900 (e.g., at least one component of the computing device 900) to perform one or more processes described herein. In some embodiments, a module is implemented in software, firmware, hardware, and/or the like.

The number and arrangement of components illustrated in FIG. 9 are provided as an example. In some embodiments, the computing device 900 can include additional components, fewer components, different components, or differently arranged components than those illustrated in FIG. 9. Additionally or alternatively, a set of components (e.g., one or more components) of the computing device 900 can perform one or more functions described as being performed by another component or another set of components of the computing device 900.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near (ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pulldown lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

What is claimed is:

1. A computing system, comprising:
   host devices comprising a first host device and a second host device;
   peripheral component interconnect express (PCIe) devices comprising one or more first PCIe devices and one or more second PCIe devices; and
   a PCIe controller comprising a PCIe switch coupled between the host devices and the PCIe devices, wherein the PCIe controller is configured to:

set a mode of the PCIe switch to be a first PCIe mode using first mode data of the first PCIe mode, and transmit, under the first PCIe mode, first data between the first host device and at least one of the PCIe devices, and set the mode of the PCIe switch to be a second PCIe mode using second mode data of the second PCIe mode, and transmit, under the second PCIe mode, second data between the first host device and the one or more first PCIe devices and third data between the second host device and the one or more second PCIe devices.

2. The computing system of claim 1, wherein the PCIe controller further comprises:
   a multiplexer comprising a first input port coupled to the PCIe switch,
   a first storage device configured to store the first mode data of the first PCIe mode and coupled to a first output port of the multiplexer, and
   a second storage device configured to store the second mode data of the second PCIe mode and coupled to a second output port of the multiplexer.

3. The computing system of claim 2, wherein the multiplexer is configured to:
   in response to receiving a select control signal, control a selection of coupling the input port to one of the first output port and the second output port based on the select control signal.

4. The computing system of claim 3, wherein the PCIe controller comprises a signal controller coupled to a second input port of the multiplexer and configured to generate the select control signal and transmit the select control signal to the multiplexer.

5. The computing system of claim 4, wherein the signal controller comprises:
   a I2C (inter-integrated circuit) master; and
   a control circuit coupled to the I2C master, and
   wherein the I2C master is configured to transmit a I2C command to the control circuit, and the control circuit is configured to generate the select control signal based on the I2C command.

6. The computing system of claim 3, wherein the multiplexer is configured to:
   transmit a device select signal from the PCIe switch through the first input port of the multiplexer to the one of the first output port and the second output port of the multiplexer to select a corresponding one of the first storage device and the second storage device.

7. The computing system of claim 6, wherein the PCIe switch comprises switch transmission ports coupled to each of corresponding first transmission ports of the first storage device and corresponding second transmission ports of the second storage device, and
   wherein the PCIe switch is configured to:
      if the first storage device is selected based on the select control signal and the device select signal, load the first mode data from the first storage device through the corresponding first transmission ports and the switch transmission ports, and set the mode of the PCIe switch to the first PCIe mode in the PCIe switch, and
      if the second storage device is selected based on the select control signal and the device select signal, load the second mode data from the second storage device through the corresponding second transmission ports and the switch transmission ports, and set the mode of the PCIe switch to the second PCIe mode in the PCIe switch.

8. The computing system of claim 7, wherein the switch transmission ports comprise:

a reset port for transmitting a resetting signal,
a clock port for transmitting a clock signal, and
one or more data ports for transmitting data.

9. The computing system of claim 2, wherein each of the first storage device and the second storage device comprises a corresponding flash read-only memory (ROM).

10. The computing system of claim 1, wherein the PCIe switch comprises downstream ports and upstream ports, each of the downstream port being coupled to a respective PCIe device of the PCI devices, each of the upstream ports being coupled to a respective host device of the host devices.

11. The computing system of claim 10, wherein, under the first PCIe mode, each of the one or more first PCIe devices and the one or more second PCIe devices communicates with each other using peer-to-peer communication directly through the PCIe switch, bypassing the first host device, and the first data is transmitted between the first host device and the one or more first PCIe devices and the one or more second PCIe devices through the PCIe switch using a data path.

12. The computing system of claim 10, wherein, under the second PCIe mode, each of the one or more first PCIe devices communicates with each other using peer-to-peer communication directly through the PCIe switch, bypassing the first host device, and the second data is transmitted between the one or more first PCIe devices and the first host device through the PCIe switch using a first data path, and each of the one or more second PCIe devices communicates with each other using peer-to-peer communication directly through the PCIe switch, bypassing the second host device, and the third data is transmitted between the one or more second PCIe devices and the second host device through the PCIe switch using a second data path that is different from the first data path.

13. The computing system of claim 1, wherein the host devices comprise at least one of one or more central processing units (CPUs), one or more data processing units (DPUs), one or more tensor processing units (TPUs), one or more quantum processing units (QPUs), one or more Application Specific Integrated Circuits (ASICs), one or more Field Programmable Gate Arrays (FPGAs), or one or more other processing devices.

14. The computing system of claim 1, wherein the PCIe devices comprise at least one of one or more Graphics Processing Units (GPUs), one or more storage devices, one or more network devices, one or more sound devices, one or more capture devices, or one or more expansion devices.

15. The computing system of claim 1, wherein the PCIe controller is configured to transmit data between the host devices and the PCIe devices using a PCIe protocol, and wherein the host devices are configured to transmit data between each other using a protocol different from the PCIe protocol.

16. The computing system of claim 1, comprising a plurality of subsystems, wherein each of the plurality of subsystems comprises a corresponding PCIe controller, corresponding host devices, and corresponding PCIe devices, and the corresponding PCIe controller comprises a corresponding PCIe switch coupled between the corresponding host devices and the corresponding PCIe devices.

17. A device, comprising:

a peripheral component interconnect express (PCIe) switch;

a multiplexer comprising an input port coupled to the PCIe switch;

a first storage device configured to store first mode data of a first PCIe mode and coupled to a first output port of the multiplexer, and a second storage device configured to store second mode data of a second PCIe mode and coupled to a second output port of the multiplexer, wherein the multiplexer is configured to:

select a corresponding one of the first storage device and the second storage device to be coupled to the PCIe switch based on a select control signal, and wherein the PCIe switch is configured to:

if the first storage device is selected, load the first mode data from the first storage device, and set a mode of the PCIe switch to be the first PCIe mode in the PCIe switch, and if the second storage device is selected, load the second mode data from the second storage device, and set the mode of the PCIe switch to be the second PCIe mode in the PCIe switch.

18. The device of claim 17, further comprising:

a signal controller coupled to a second input port of the multiplexer and configured to generate the select control signal and transmit the select control signal to the multiplexer.

19. A method, comprising:

selecting, by a peripheral component interconnect express (PCIe) controller, one of a first PCIe mode and a second PCIe mode for a PCIe switch that is coupled between host devices and PCIe devices, the PCIe controller comprising the PCIe switch, the host device comprising a first host device and a second host device; and performing, by the PCIe controller, data transmission between the host devices and the PCIe devices using the selected one of the first PCIe mode and the second PCIe mode, wherein performing the data transmission comprises one of:

if the first PCIe mode is selected, setting a mode of the PCIe switch to be the first PCIe mode using first mode data of the first PCIe mode, and transmitting, under the first PCIe mode, first data between the first host device and at least one of the PCIe devices, and if the second PCIe mode is selected, setting the mode of the PCIe switch to be the second PCIe mode using second mode data of the second PCIe mode, and transmitting, under the second PCIe mode, second data between the first host device and one or more first PCIe devices of the PCIe devices and third data between the second host device and one or more second PCIe devices of the PCIe devices.

20. The method of claim 19, wherein selecting the one of the first PCIe mode and the second PCIe mode for the PCIe switch comprises:

generating a select control signal for a multiplexer coupled between the PCIe switch and a first storage device storing the first mode data of the first PCIe mode and a second storage device storing the second mode data of the second PCIe mode; and selecting a corresponding one of the first storage device and the second storage device based on the select control signal to be coupled to the PCIe switch using a device select signal from the PCIe switch, the corresponding one of the first storage device and the second 5 storage device storing corresponding mode data of the selected one of the first PCIe mode and the second PCIe mode, wherein the method further comprises:

loading, by the PCI switch, the corresponding mode 10 data of the selected one of the first PCIe mode and the second PCIe mode from the corresponding one of the first storage device and the second storage device into the PCI switch, and setting, by the PCI switch, the mode of the PCI switch 15 to be the selected one of the first PCIe mode and the second PCIe mode.

* * * * *